CRYSTAL ASSEMBLY

Filed Oct. 22, 1954

Inventor
John D. Holmbeck
by Carlson, Pitzner, Hubbard & Wolfe
Attorneys

United States Patent Office 2,808,523

Patented Oct. 1, 1957

2,808,523

CRYSTAL ASSEMBLY

John D. Holmbeck, Sandwich, Ill., assignor to The James Knights Company, Sandwich, Ill., a corporation of Illinois Application October 22, 1954, Serial No. 464,087

2 Claims. (Cl. 310—8.2)

Figure 1:
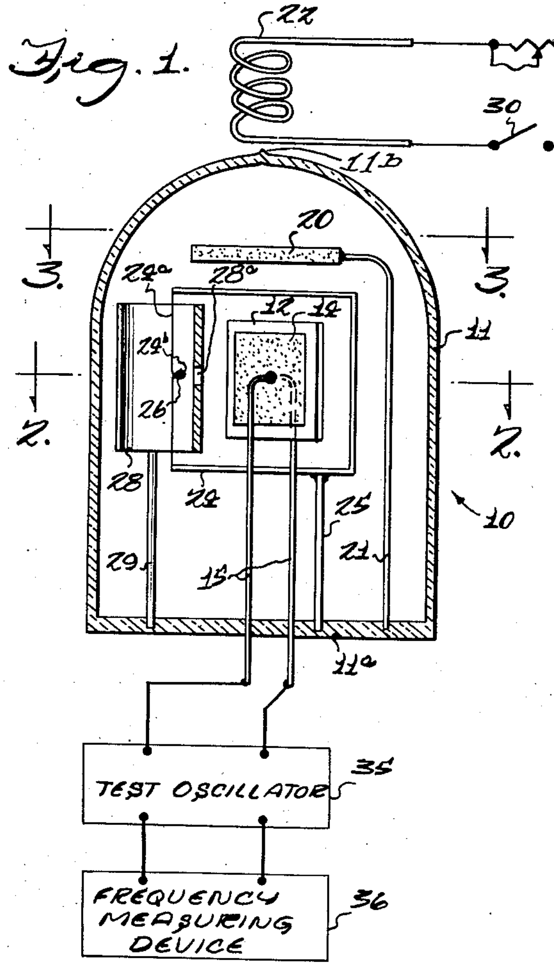

The present invention relates in general to piezoelectric crystals of the type used for determining and stabilizing frequency in electronic oscillators. More particularly, the invention is concerned with assemblies in which such crystals are mounted within an evacuated and tightly sealed envelope.

It has been a common practice in the manufacture of such crystals to mount them within evacuated and sealed envelopes in order to minimize the effects of changing pressure, humidity and temperature, as well as to exclude foreign matter, which cause changes or instability in the operating frequencies of the crystals. Since piezoelectric crystals are most often used as precise frequency standards, it is highly important in the first instance that the crystal be calibrated to the desired operating frequency and that it stably maintain that frequency under the most extreme conditions of use.

Even though a given crystal is carefully cut and originally coated with conductive metal of proper thickness to provide exactly the desired operating frequency, slight variations in the crystal frequency inevitably arise as an incident to fixing it in an envelope, evacuating the envelope, and subsequently sealing the envelope. Of course, when the envelope is complete, direct access may not be had for etching the crystal or for changing the thickness of metal coatings on its surface so as to adjust the operating frequency to the desired value. Proposals have been made for decreasing the crystal frequency to the desired value after the envelope is sealed by disposing a vaporizable metal pellet in the envelope and connecting such pellet in circuit with electrical leads extending through the envelope. Current supplied through such leads heats the pellet and causes vaporized metal to be deposited on the crystal, thereby "loading" the crystal and decreasing the frequency of operation.

It is the general aim of the present invention to make possible precise reductions in the operating frequency of a crystal after the latter is sealed in an envelope, yet without the necessity for any electrical leads, except those for the crystal itself, extending through the envelope.

Concurrent with that aim, it is another object of the invention to provide an effective yet highly convenient means for obtaining the high degree of vacuum necessary within the envelope, such means being activated by the same instrumentality as is used to cause the aforementioned vaporization of metal within the envelope. In result, therefore, the invention contemplates an evacuated and hermetically sealed crystal assembly which is given a high degree of vacuum after the envelope is sealed and in which the operating frequency of the crystal may be precisely adjusted after the envelope is sealed, all without the necessity of leads, other than those for the crystal, extending through the envelope.

Figure 2:
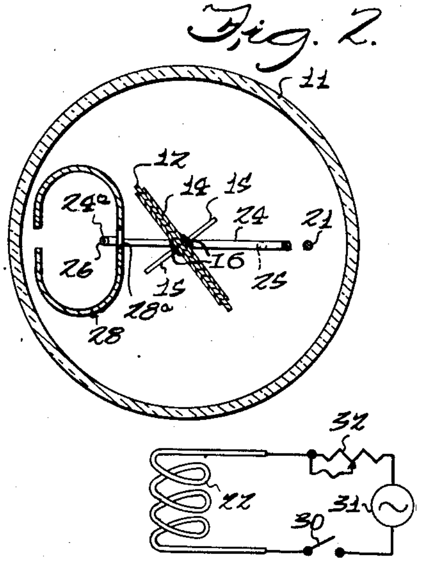
Figure 3:
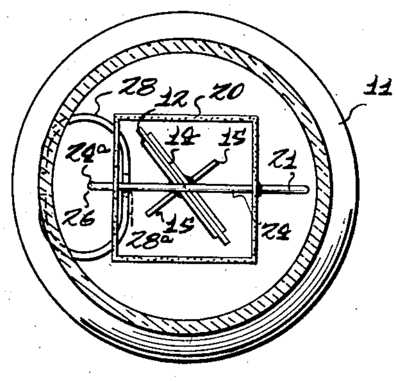
Figure 4:
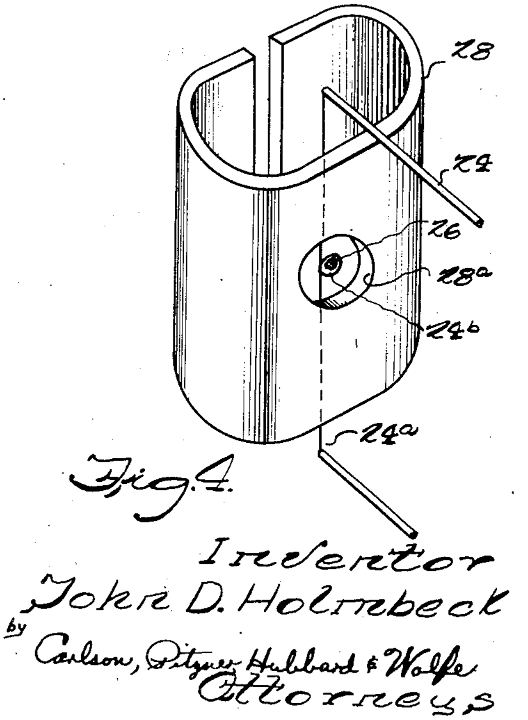

Other objects and advantages will become apparent as the following description proceeds, taken in conjunction with the accompanying drawings, in which:

Figure 1 is a vertical section through a crystal assembly embodying the features of the invention, further illustrating apparatus employed to effect a high vacuum in the envelope, and for precisely adjusting the crystal operating frequency subsequent to sealing of the envelope;

Figs. 2 and 3 are horizontal sectional views taken substantially along the lines 2—2 and 3—3, respectively, in Fig. 1; and Fig. 4 is a detailed view, in perspective, of means employed in the assembly for the purpose of frequency adjustment.

While the invention has been shown and is described in some detail with reference to a particular embodiment thereof, there is no intention that it thus be limited to such detail. On the contrary, it is intended here to cover all modifications, alternative constructions and equivalents falling within the spirit and scope of the invention as defined by the appended claims.

Referring now to the drawings, the invention has been illustrated as embodied, by way of example, in a crystal assembly 10 which includes a non-conductive envelope 11 made of glass, and a crystal 12 supported therein. The crystal is a carefully cut wafer of natural or synthetic quartz or similar resonant piezoelectric material, metal coatings 14 being applied to its opposite faces for establishing electrical and supporting connections thereto. For supporting the crystal and providing external electrical leads, a pair of relatively stiff metal stems or wires 15 are sealed in a stem press portion **11*a* at the bottom of the envelope. At their upper ends, these wires are turned inwardly and bonded to the coatings 14 by suitable means such as solder connections 16. The lower ends of the wires 15 project through the stem press portion 11*a*** for external connection to electrical circuit components with which the crystal is to be employed, the stems being sufficiently stiff to afford physical mounting of the entire assembly at the same time.

The envelope 11 is completely sealed, for example, by closing an exhaust tubulation **11*b* after initial evacuation. However, as noted before, the steps of connecting the leads 15 to the crystal, and of evacuating and sealing the envelope, inevitably cause slight changes in the operating frequency of the crystal from the exact and precise value desired. It is therefore desirable to adjust the operating frequency of the crystal after the envelope is complete. As a practical matter it is also extremely difficult to exhaust the envelope 11** to the high degree of vacuum required by using vacuum pumps or similar equipment. Accordingly, it is desirable that a final reduction in pressure within the envelope be made after the latter is completely sealed.

In accordance with the invention, means are provided within the envelope 11 for reducing the operating frequency of the crystal 12 after the envelope is sealed, and for reducing the pressure within the envelope to a substantially perfect vacuum, all without the necessity of external electrical connections. In accomplishing this, vaporizable metal and gettering material are placed in the envelope at the time of its assembly in a manner such that both may be independently activated by electromagnetic induction means located externally of the envelope.

As shown in the present instance, a first closed conductive loop 20 is supported in a horizontal orientation near the top of the envelope by means of a rigid stem 21 bonded in but not extending through the press portion **11*a*. As best shown in Fig. 3, a quantity of gettering material such as barium or tantalum is coated on the metallic loop 20 so that such material is heated when an excited induction coil 22 is brought near the upper surface of the envelope. Induced currents cause the loop 20 to reach a red heat, the gettering material thus being activated to absorb occluded gases such as nitrogen and oxygen, thereby increasing the degree of vacuum within the envelope. It has been found, for example, that the envelope need only be reduced to a vacuum of about 100 microns prior to sealing of the tubulation 11*b***. Subsequent inductive activation of the gettering material causes the latter to react with such gases so that the vacuum is increased to a value of about 1 micron or less.

In order to afford frequency adjustment of the crystal 12, a second conductive loop 24 is also supported within the envelope on a suitable stem 25 which is bonded in but which does not extend through the envelope press portion **11*a*. The second closed loop 24 surrounds the crystal and is oriented with its axis at right angles to that of the first loop 20 in order that the two loops may be independently excited by an external induction coil. As shown in the present instance, the closed loop 24 is formed on three sides of relatively heavy metal rod, while the fourth side is formed by a filament 24*a* adapted to be heated to a high temperature in response to electric current flowing in the loop. The filament 24*a* is formed with a central bight 24*b* in which a globule 26 of vaporizable metal is held. While various vaporizable metals may be employed, the globule 26 is preferably of the same metal as the coatings 14, gold or silver for example, being commonly used. When the globule 26 is heated by inductively coupling the loop 24 with the external induction coil 22 (Fig. 2), it is retained by surface tension in the bight 24*b* even though it assumes a molten state. Such particles of the metal which are vaporized from the metal pellet condense on various surfaces throughout the envelope, and in condensing on the coatings 14 and the crystal 12** serve to decrease the frequency of crystal operation. With the coatings originally made light enough that the crystal frequency is above the desired value, it is but a simple matter to add a sufficient amount of metal by condensation to decrease the frequency to the value desired.

In order to confine metal vapor emanating from the heated pellet 26, a shield 28 is preferably located in partially surrounding relation with the loop 24 and provided with an opening **28*a* which directs metal vapors toward the crystal 12. Such a shield may be in the form of an arcuate metal sheet supported within the envelope 11 by a suitable stem 29 bonded in its lower end in the press portion 11*a*. The opening 28*a* is so located and is of such size as to afford substantially direct communication between the globule 26 and the face of the crystal 12**.

It will be apparent from the foregoing that the high degree of vacuum necessary within the envelope 12 may be obtained by exciting the getter loop 20 by means of the external induction coil 22. After this operation is complete, it is only necessary to reposition the envelope 11 and the coil 22 relative to one another so that the conductive loop 24 has currents induced therein. The steps in completing the crystal assembly, after the envelope has been partially exhausted and sealed, are as follows.

First, the coil 22 is brought adjacent to the top of the envelope 11 with its axis alined with that of the loop 20. Closure of a switch 30 in series with the coil and a suitable alternating current source 31 energizes the coil 22 through an adjustable resistor 32. Inductive coupling between the coil 22 and the loop 20 creates currents in the latter which heat it to a very high temperature. This activates the gettering material on the loop 20 and causes the removal of occluded gases in the envelope and a consequent increase in the envelope vacuum. It will be noted that since the loops 20 and 24 are oriented at right angles with respect to one another, the latter is not energized by the coil 22 at this time.

As a next step, the relative positions of the envelope 11 and the induction coil 22 are adjusted so that the axes of the coil and the loop 24 coincide (Fig. 2). At this time, the crystal 12 is connected in circuit as the frequency controlling element with a test oscillator 35 (Fig. 1), the oscillator working into a frequency measuring device 36 of any suitable type. Closure of the switch 30 and the resultant energization of the coil 22 from the source 31 induces electrical currents in the loop 24 to cause heating of the filament **24*a* and melting of the globule 36. Vaporization of the metal pellet thus occurs and vaporized metal is progressively condensed on the coatings 14 to decrease the crystal's operating frequency. The switch 30 is maintained in its closed position until the exact frequency desired is indicated by the frequency measuring device 36. The switch 30** is then opened and the assembly is complete with the frequency at precisely the desired value.

The entire operation of increasing the envelope vacuum and adjusting the frequency may be carried out in a relatively short period of time since the same induction coil 22 may be used for both operations. And by virtue of the fact that the two conductive loops 20 and 24 are oriented at right angles, the vacuum may be increased to its final value before the frequency adjustment is made, the adjustment therefore taking into account the low pressure in which the crystal will operate from that time on.

I claim:

1. A crystal assembly comprising, in combination, an evacuated and hermetically sealed envelope, a crystal mounted in and provided with electrical leads extending through said envelope, a first closed conductive loop within said envelope and provided with gettering material thereon, a second closed conducting loop within said envelope oriented with its axis at right angles to the axis of the first loop, said second loop including a small quantity of vaporizable metal and a filament supporting the same, and a shield partially surrounding said vaporizable metal and having an opening for directing vaporized metal toward said crystal.

2. In an assembly including a crystal mounted within an evacuated and hermetically sealed glass envelope, the combination comprising a globule of vaporizable metal, a filament supporting said globule, a first closed conductive loop having one portion thereof formed by said filament, means totally inside the envelope for supporting said first loop, a second closed conductive loop having gettering material thereon, means totally inside the envelope for supporting said second loop in a position to be relatively unaffected by electromagnetic flux linking said first loop so that said second and first loops may be individually inductively coupled to a coil external of the envelope for successively increasing the vacuum in the envelope and depositing vaporized metal on the crystal to decrease its frequency of operation.

References Cited in the file of this patent

UNITED STATES PATENTS

| | | |
|---|---|---|
| 1,720,005 | Ryan | July 9, 1929 |
| 2,054,030 | Charlton et al. | Sept. 8, 1936 |
| 2,097,157 | Jameson | Oct. 26, 1937 |
| 2,505,370 | Sykes | Apr. 25, 1950 |